United States Patent [19]

Terai et al.

[11] 4,444,076
[45] Apr. 24, 1984

[54] ROCKING TYPE FLYING SHEARS WITH STATIONARY SHEARING FUNCTION

[75] Inventors: Kenji Terai; Katsuto Sudo; Yoshiki Nakamura, all of Fukuoka, Japan

[73] Assignee: Nippon Steel Corporation, Tokyo, Japan

[21] Appl. No.: 420,577

[22] Filed: Sep. 20, 1982

Related U.S. Application Data

[63] Continuation of Ser. No. 190,888, Sep. 25, 1980, abandoned.

[30] Foreign Application Priority Data

Sep. 29, 1979 [JP] Japan .................................. 54-126291

[51] Int. Cl.³ .............................................. B23D 25/06
[52] U.S. Cl. ........................................ 83/316; 83/284
[58] Field of Search ............................ 83/284, 315–317

[56] References Cited

U.S. PATENT DOCUMENTS 2,415,325  2/1947  Wood ............................... 83/284 X
2,436,572  2/1948  Hanschker ....................... 83/316 X

*Primary Examiner*—James M. Meister
*Attorney, Agent, or Firm*—Cushman, Darby & Cushman

[57] ABSTRACT

Rocking type flying shears having a main crank shaft for shearing and a rocking crank shaft which sways a cutter, the shears being provided with a phase converter which permits selective setting of the phase of the rocking crank shaft on either of two phases relative to the main crank shaft. This arrangement enables the shears to perform a shearing operation on a material to be sheared either while it is on the move or in repose.

1 Claim, 10 Drawing Figures

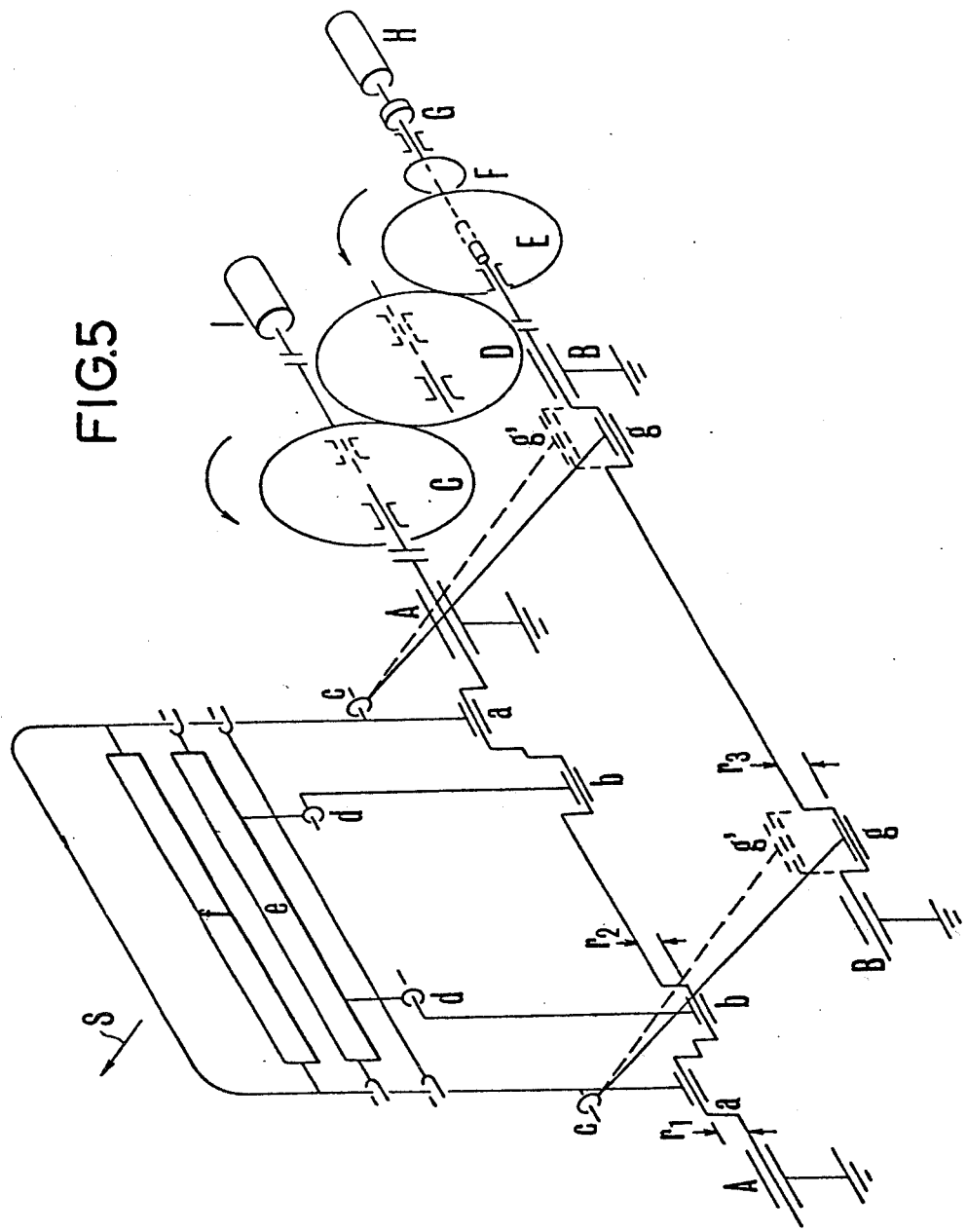

ROCKING TYPE FLYING SHEARS WITH STATIONARY SHEARING FUNCTION

This is a continuation, of application Ser. No. 190,888 filed Sept. 25, 1980, now abandoned.

BACKGROUND OF THE INVENTION

1. Field of the Invention

This invention relates to rocking type flying shears adapted for performing a shearing operation on a steel strip during continuous treatments, such as pickling, annealing, plating, and more particularly to a shearing arrangement which is capable of shearing a strip while it is either in motion or in repose without difficulty according to the operational conditions.

2. Description of the Prior Art

Generally, in the continuous strip treating facilities, strips which have been wound up into a coil shape are uncoiled and joined into one continuous strip by a suitable means such as a welder for continuously carrying out various treatments as desired. Upon completion of these treatments, the treated strip is again wound up into coils. During such an operation, the strip must be sheared for removal of unsatisfactory portions of the strip, for dividing it into desired lengths or for obtaining samples. For this purpose, stationary guillotine type shears called up-cut shears have been used in general. However, the up-cut shears necessitate stopping the strip for every shearing operation thereon and thus requires much time for shearing, resulting in a limited production capacity of the continuous treating facilities as a whole. Meanwhile, in recent years, greater demands for increasing the speed and productivity of continuous treating facilities has been made. To meet these demands, the above stated stationary guillotine shears have been increasingly replaced with rocking guillotine shears, drum shears, etc. which are called "flying shears" and are capable of performing a shearing operation on a moving steel strip. The problem with the use of the conventional stationary guillotine shears in increasing speed and productivity of a continuous treating mill, has been solved by the flying shears. On the other hand, however, the use of the flying shears now has come to present another problem that the strips cannot be sheared when they are in repose. In continuously treating a strip, the operation sometimes is stopped for the purpose of changing operating conditions or carrying out trouble shooting or maintenance check-up. In such cases the strip often must be sheared while it is in repose. However, the conventional flying shears being designed for shearing a moving strip and not for shearing a stationary strip, they have been either incapable of shearing, or tend to cause an unsatisfactory cut end shape or to damage the cutting edges thereof.

SUMMARY OF THE INVENTION

It is therefore an object of the present invention to provide shears which solve the above stated problems confronted by the conventional shears and are capable of performing shearing operations on strips both in motion and in repose.

The shears according to the present invention are provided with a phase converter device which is disposed within a mechanism connecting a shearing main crank shaft and a rocking crank shaft to each other and is arranged to permit selective setting of the relative phases of the two shafts into one of two steps, one for shearing a moving strip and the other for shearing a stationary strip. With this arrangement, the degree of eccentricity of each of the crank shafts is suitably selected for flyiing and stationary shearing functions, either of which can be selected through a very simple operation.

The above and further objects, features and advantages of the invention will become apparent from the following detailed description of a preferred embodiment thereof taken in connection with the accompanying drawings.

BRIEF DESCRIPTION OF THE DRAWINGS

FIG. 5 is a skeleton diagram showing rocking type flying shears as embodiment of the present invention.

DETAILED DESCRIPTION OF THE PREFERRED EMBODIMENT

Figure 1:
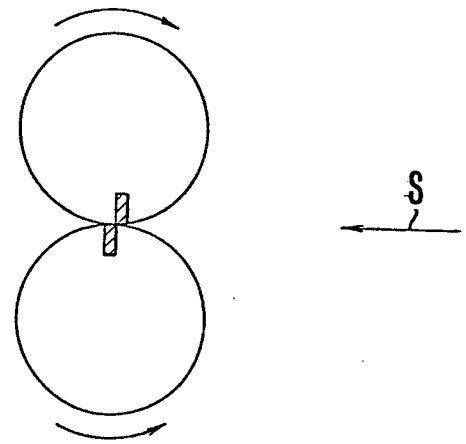
FIG. 1 is an illustration showing the operating principle of the conventional drum shears.
Figure 2:
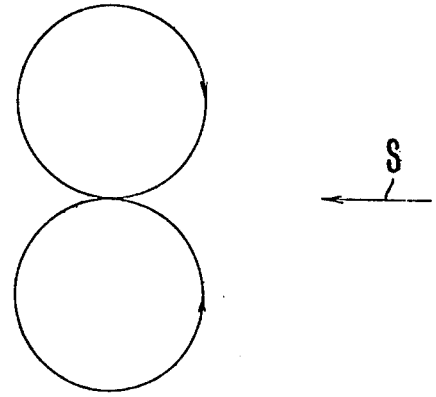
FIG. 2 is an illustration showing the loci of cutting edges obtained from the drum shear arrangement shown in FIG. 1.

In the accompanying drawings, an arrow mark S indicates the travelling direction of a strip or a material to be sheared. The conventional drum shears operates on the principle as shown in FIG. 1 and the loci of the cutting edges of the drum shears are as shown in FIG. 2. The operating principle of the conventional drum shears is well known and, therefore, the detailed description thereof is omitted from description herein.

Figure 3:
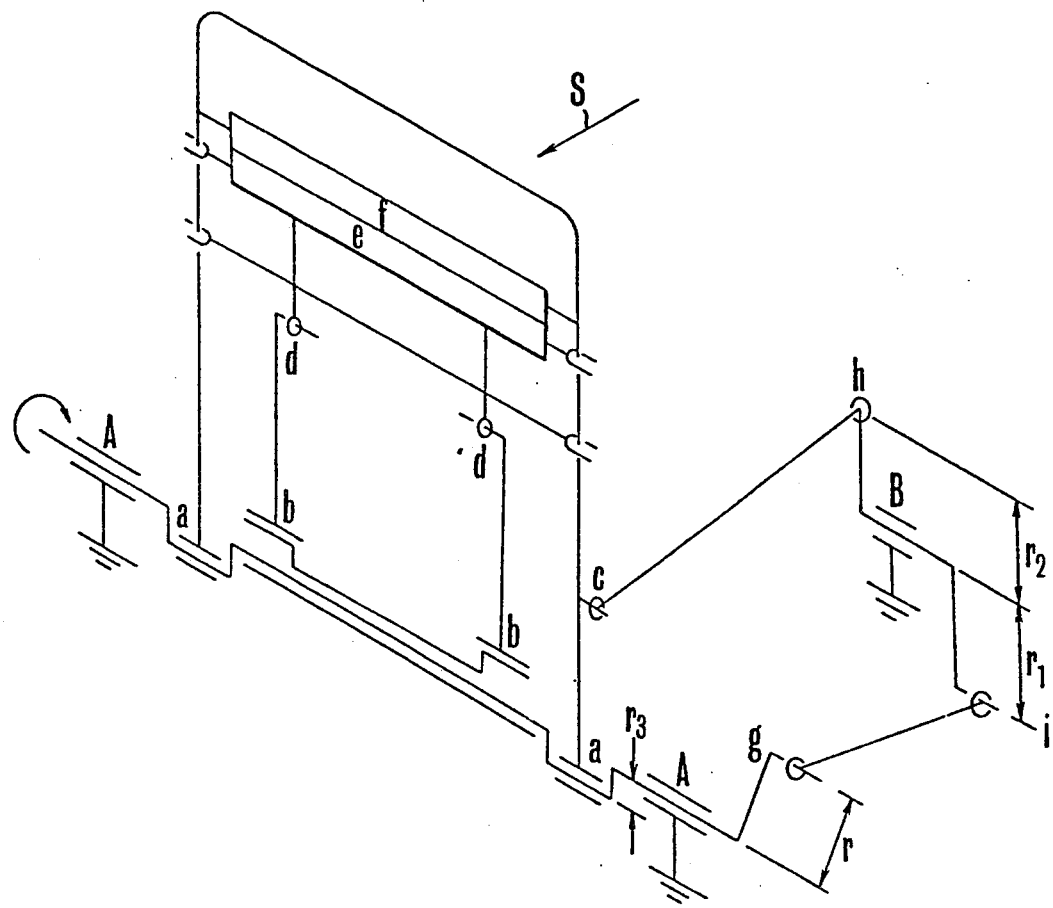
FIG. 3 is a skelton diagram showing an example of the conventional rocking type guillotine shears.

In FIG. 3 which is a skeleton diagram of an example of the conventional rocking type guillotine shears, a reference symbol A indicates the center of the shaft of a shearing crank; B the center of the shaft of a rocking crank; a, b, g, h and i indicate the centers of the eccentric shafts of cranks; c indicates the center of a rocking arm pin; d indicates the center of a lower cutting edge holder; and e and f indicate upper and lower cutting edges. Further, r, r1, r2 and r3 indicate degrees of eccentricity of each crank with r being arranged to be variable in synchronism with the line speed of the processing facilities. Since this skeleton diagram represents the conventional rocking type shear and is well known, further details are omitted from description here.

Figure 4:
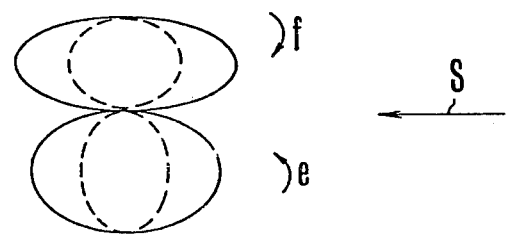
FIG. 4 is an illustration showing the loci of cutting edges obtained from the guillotine shear arrangement shown in FIG. 3.

The loci of the upper and lower cutting edges which are arranged as shown in FIG. 3 are as shown in FIG. 4. The loci obtained at the maximum degree of eccentricity r ($r = r_o$) are indicated by full lines while the loci obtained at the minimum degree of eccentricity r ($r = \theta$) are indicated by broken lines.

As apparent from the loci shown in FIGS. 2 and 4, the conventional flying shears have each of the cutting edges move in the lateral direction. Therefore, when a shearing operation is performed on a material to be sheared while the material is in repose, the material is sheared with a lateral force exerted thereon. Meanwhile, the cutting edges perform the shearing operation while having a lateral force exerted thereon. This tends to cause either an unsatisfactory shape of the cut end of the material or a trouble such as damaging the cutting edges or having the material not sheared.

FIG. 5 is a skeleton diagram showing a rocking type flying shear arrangement as embodiment of the present invention. This embodiment comprises a shearing crank shaft A-A; a rocking crank shaft B-B; an example of a phase converting device, C, D and E consisting of a gear train (hereinafter the converting device will be described); and a driving device I which is arranged to drive the crank shafts and the phase convering device. There are provided a clutch F which transmits the rotating force of the gear E to the rocking crank shaft B-B and another clutch G which transmits a torque of a torque actuator H to the rocking crank shaft B-B. For a normal shearing operation, a force required for this is transmitted from the driving device I to the shearing crank shaft A-A and from the driving device I to the rocking crank shaft B-B through the gear train C, D and E and the clutch F while the clutch G remains in an open state.

In FIG. 5, reference symbols a, b, c, d, e, f and g indicate the centers of eccentric crank shafts (a, b and g), the center of a rocking arm pin (c), the center of a lower cutting edge holder (d) and upper and lower cutting edges (e and f). Symbols r1, r2 and r3 respectively indicate degrees of eccentricity of the cranks. The gears C and E are of the same diameter of pitch circle. The shearing crank shaft A-A and the rocking crank shaft B-B are thus arranged to rotate in the same direction and at the same number of revolution.

Figure 7:
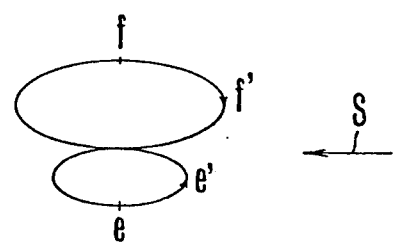
FIG. 7 is an illustration showing the loci of cutting edges of the same embodiment under the shearing operation on a moving strip.
Figure 6:
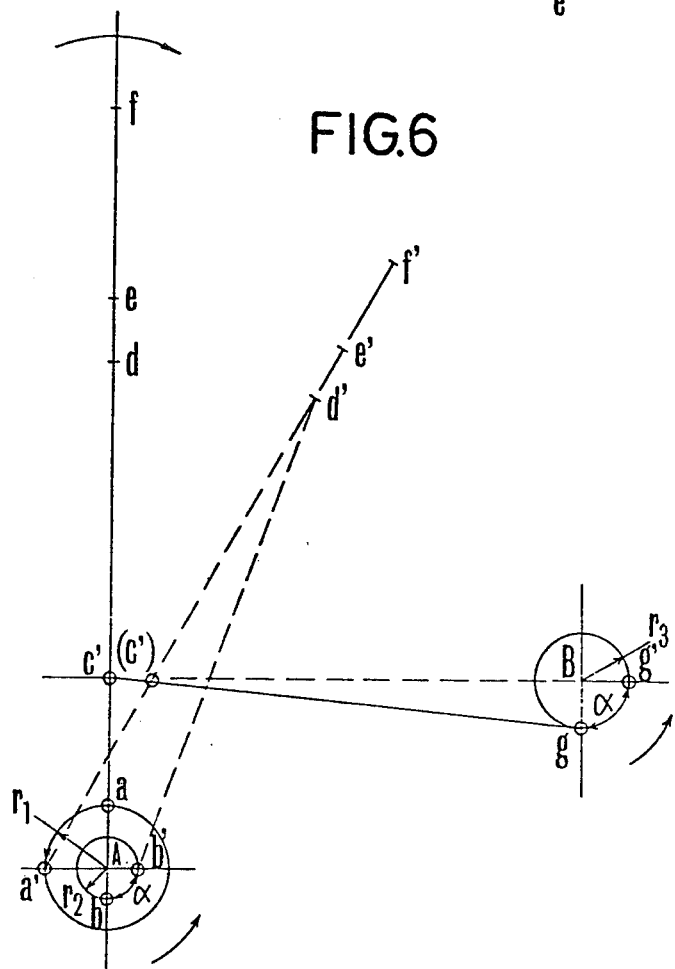
FIG. 6 is an illustration showing the operating principle of the embodiment shown in FIG. 5 as in a shearing operation performed on a moving strip.

The operating principle of the shears shown in FIG. 5 in shearing a moving material is as shown in FIG. 6. Assuming that the phases of the center a of the upper cutting edge crank shaft, the center b of the lower cutting edge crank shaft and the center g of the rocking crank shaft are arranged in positions as shown in FIG. 6, when the shearing crank shaft A-A and the rocking crank shaft B-B are rotated to an extent of $\alpha°$, the crank shaft centers a, b, and g come to positions a', b' and g' respectively while the upper cutting edge f, the lower cutting ege e, the rocking arm pin c and the lower cutting edge holder center d move to positions f', e', c' and d' respectively. As apparent from this drawing, the upper and lower cutting edges e and f sway to a great extent when the two crank shafts A-A and B-B are driven with the above stated phases. FIG. 7 shows the loci of the cutting edges in this operation.

Figure 9:
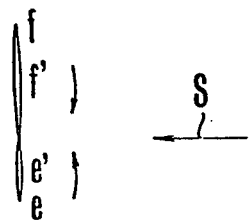
FIG. 9 is an illustration showing the loci of cutting edges of the same embodiment under the stationary strip shearing operation.
Figure 8:
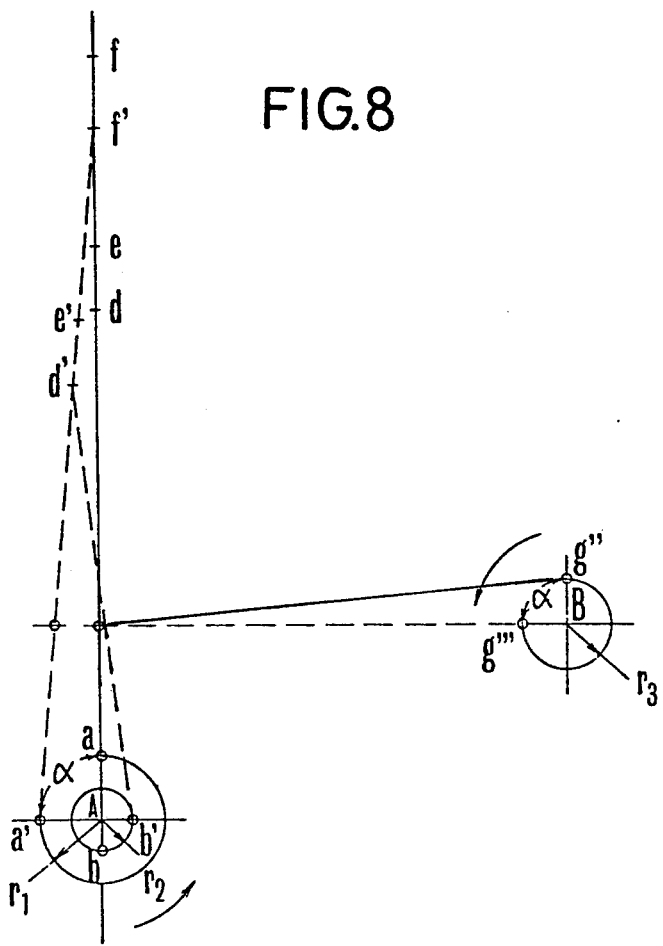
FIG. 8 is an illustration showing the operating principle of the embodiment shown in FIG. 5 as in a shearing operation on a stationary strip.

The operating principle of the same shears in shearing a stationary material is as shown in FIG. 8. With the phases of the center a of the upper cutting edge crank shaft, the center b of the lower cutting edge crank shaft and the center g'' of the rocking crank shaft arranged in positions as shown in FIG. 8, when the shearing crank shaft A-A and the rocking crank shaft B-B are rotated to an extent of $\alpha°$, the crank shaft centers a, b and g'' come to positions a', b'and g''' while the upper cutting edge f, the lower cutting edge e, the rocking arm pin c and the center d of the lower cutting edge holder come to positions f', e' and d'. As apparent from FIG. 8, the upper and lower cutting edges e and f are little swayed when the two crank shafts A-A and B-B are driven with the above stated phases. FIG. 9 shows the loci of the cutting edges in the stationary shearing operation. Further, as will be clearly understood from FIG. 9, the upper and lower cutting edges move almost vertically and the swaying motions shown in FIGS. 2, 4 and 7 are nullified, so that the material can be sheared without any lateral force exerted thereon.

In order that the upper and lower cutting edges e and f make no lateral movement, the degree of eccentricity and the arm length must satisfy the following formula:

$$\frac{r1}{r3} \approx \frac{\text{Distance from the center } (a) \text{ of the upper cutting edge crank shaft to the tip of the upper cutting edge } (f)}{\text{Distance from the center } (c) \text{ of the rocking arm pin to the tip of the upper cutting edge } (f)}$$

Meanwhile, the phase difference $\theta$ between the center g of the rocking crank shaft at the time of the flying shearing and the center g'' of the rocking crank shaft at the time of the stationary shearing is about 180° ($\theta \div 180°$).

In performing phase conversion, the driving device I is stopped. The clutch G is closed, and thus the rocking crank shaft B-B is brought into engagement with the torque actuator H. The clutch F is opened to disengage the rocking crank shaft from the shearing crank shaft. Then, the torque actuator H is operated to rotate the rocking crank shaft B-B a preset angle $\theta$.

Figure 10:
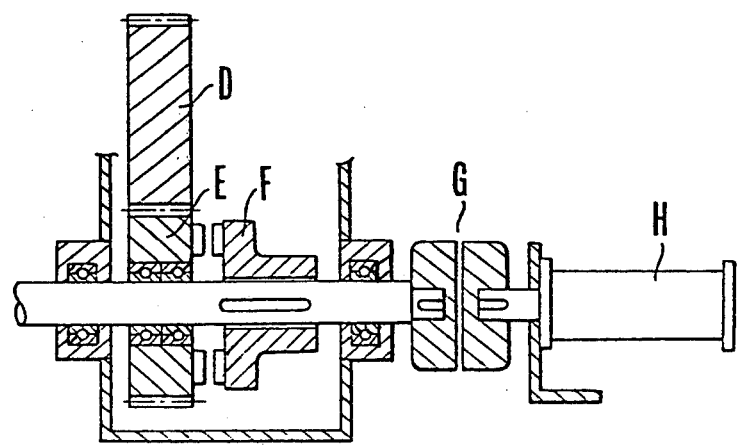
FIG. 10 is a schematic view showing a main part of phase converting device of the rocking crank shaft of the above stated embodiment.

The phase conversion is effected by moving the center of the rocking crank shaft from g to g'' for switch-over from a shearing operation on a moving material to a shearing operation on a stationary material and from g'' to g for switch-over from a stationary material shearing operation to a moving material shearing operation. The rocking crank shaft is arranged as schematically illustrated in FIG. 10.

What is claimed is:
1. Rocking type flying shears comprising:
a first blade having an upper cutting edge;
a second blade having a lower cutting edge;
a main crank shaft coupled to said first and second blades with a first eccentricity (r1) controlling movement of said first blade up and down and a second eccentricity (r2) controlling movement of said second blade up and down to effect shearing;
a rocking crank shaft mounted for swaying motion with a third eccentricity (r3);
a rocking type flying shear body coupling said first blade to said main crank shaft for effecting said up and down movement of said first blade, said second blade being mounted for sliding movement along said shear body, said body having rocking pins thereon;
means coupling said rocking crank shaft to said rocking pins for transmitting said swaying motion to said blades;
a motor;
a gear train including at least two synchronizing gears for transmitting the drive force of said motor simultaneously to said main and rocking crank shafts;
a phase converter including a first clutch for coupling said main and rocking crank shaft for setting the shears for operation in a first mode in which material to be sheared is in repose and a second mode in which material to be sheared is moving, the change between modes being achieved by rotating the main and rocking crank shafts 180° with respect to each other while said first clutch is open; and a torque actuator and a second clutch coupled to one of said crank shafts for rotating said one shaft to effect said change of mode, the ratio r1/r3 satisfying the formula $$\frac{r1}{r3} \approx \frac{\text{Distance from the center of the main crank shaft to the tip of the upper cutting edge}}{\text{Distance from the center of each rocking pin to the tip of the upper cutting edge}}$$

* * * * *